United States Patent Office 2,693,464
Patented Nov. 2, 1954

2,693,464

TRIAZOLE AZO AND AZOXY DYESTUFFS

Walter Hanhart, Riehen, Switzerland, assignor to Ciba Limited, Basel, Switzerland, a Swiss firm No Drawing. Application July 16, 1951,
Serial No. 237,060

Claims priority, application Switzerland July 21, 1950

8 Claims. (Cl. 260—143)

According to the present invention new, valuable azo dyestuffs are obtained when a diazo compound of an amine of the general formula

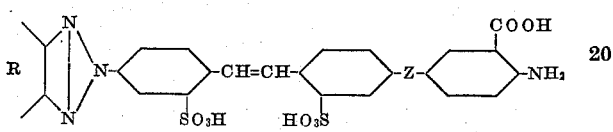

in which R indicates an aromatic radical which contains at the most two condensed rings and is condensed with the triazole ring at the positions indicated by the valence bonds and Z indicates an azo or azoxy group, is coupled with a pyrazolone and, if desired, the dyestuff thus obtained treated with an agent providing metal. Thus R may be a naphthalene radical free from further auxochromic groups. As starting materials such 3-methyl-5-pyrazolones may be used as are substituted in 1-position by an aromatic radical of the benzene or naphthalene series which is free from sulfonic acid groups, preferably by a diphenyl radical.

The following remarks may be made with regard to the starting materials of the present process:

The compounds of the formula set forth above may be prepared in various ways.

Thus, for example, diazotized 4-nitro-4'-amino-stilbene-2:2'-disulfonic acid may be coupled with an aromatic amine which couples in adjacent position to the amino group, the o-aminoazo dyestuff then oxidized to the triazole and the latter condensed on the nitro group with 2:5-diamino-benzene-1-carboxylic acid. As azo components there are concerned in this case, for example, amines of the naphthalene series which couple in o-position to the amino group and preferably such as contain no further auxochromic group, as for example: 2-aminonaphthalene, 1-aminonaphthalene-4- or -5-sulfonic acid, 2-aminonaphthalene-6- or -7-sulfonic acid, 1-amino-naphthalene-4:8-disulfonic acid, 2-aminonaphthalene-3:6-disulfonic acid.

Instead of carrying out the condensation mentioned above, the nitro triazole compound can also be reduced to the amino triazole compound and this latter diazotized and coupled with 2-aminobenzene-1-carboxylic acid.

A further method for the production of the starting materials set forth above consists in that diazotized 4-nitro-4'-aminostilbene-2:2'-disulfonic acid is coupled with 2-aminobenzene-1-carboxylic acid, the amino group in the aminoazo dyestuff thus obtained is acylated (for example acetylated), the nitro group in 4-position of the stilbene radical reduced to the amino group and thereupon the reduction product diazotized and coupled with an amine of the naphthalene series which couples in adjacent position to the amino group, the oxidation of the o-aminazo grouping to the triazole then carried out and finally the acylamino group hydrolyzed.

The reactions necessary for the preparation of these starting materials can all be carried out in the conventional manner. The couplings with the aromatic amines which couple in adjacent position to the amino group, are suitably effected in a weak acid medium. The oxidations to the triazoles can be brought about, for example, by means of alkali hypochlorite or also by heating in the presence of copper salts. The condensation of the nitro monoazo dyestuff with the 2:5-diaminobenzene-1-carboxylic acid is conducted, for example, by heating these substances in dilute alkali hydroxide solution.

The reduction of the nitro compounds to the amines must obviously be carried out in such a manner that the azo group is not attacked, for example by means of alkali or ammonium sulfides at about 60–70° C. The 2-aminobenzene-1-carboxylic acid is suitably coupled in a weakly acid medium, for example acid with acetic acid and buffered with alkali acetate, and in the form of the ω-methane sulfonic acid. When the coupling is complete, the ω-methane sulfonic acid group is split off, for example by heating in dilute alkali hydroxide solution.

The pyrazolones which likewise serve as starting materials in the present process may preferably be 1-aryl-3-methyl-5-pyrazolones, especially such as contain in 1-position an aromatic radical of the benzene series. Valuable results are obtained, for example, with pyrazolones of the formula

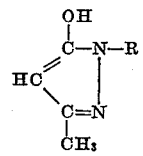

in which R indicates a radical containing two benzene rings, one benzene ring being attached directly to the nitrogen atom of the pyrazolone ring, and being itself attached in one of the positions meta or para to its own point of attachment, directly or by means of a bridge member, for example a —CO—NH—OC— or -O- bridge, to the second benzene ring. As examples of suitable pyrazolones there my be mentioned:

1 - phenyl-3-methyl-5-pyrazolone, 1-[1':1''-diphenyl-(4')]-3-methyl-5-pyrazolone of the formula

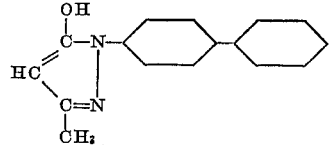

1 - [4'' - benzolylamino-1':1''-diphenyl-(4')]-3-methyl-5-pyrazolone, 1-[4''-amino- or 4'''-acetylamino-1':1'''-diphenyl-(4')]-3-methyl-5-pyrazolone, 1-[naphthyl-(2')]-3 - methyl - 5 - pyrazolone, (3' - or 4' - benzoylamino)-phenyl - 3-methyl-5-pyrazolone, 1-phenyl-(1')-3-methyl-5-pyrazolone-3'-carboxylic acid phenylamide.

If desired pyrazolones also containing sulfonic acid groups can be used such as 1-(3'-or 4'sulfo)-phenyl-3-methyl-5-pyrazolone.

As regards the manufacture of the new dyestuffs themselves the following remarks may be made with respect to the first process mentioned above:

The diazotization of the amines of the formula set for above, takes place with advantage by the so-called indirect method, that is to say by combining a solution of an alkali salt of the compound to be diazotized, which solution contains a small excess of alkali, with an excess of dilute hydrochloric acid.

According to a further feature of the invention the dyestuffs can be manufactured by a modified process in which an amino azo dyestuff of the constitution

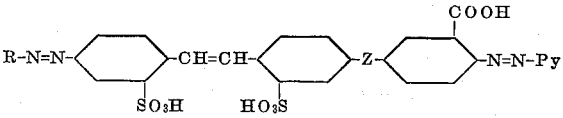

in which R indicates an aromatic radical containing at the most two condensed rings, which radical contains an —NH₂-group in adjacent position to the azo group, Z an azo or azoxy group and Py the radical of a 5-pyrazolone attached in 4-position to the azo group, is oxidized to the triazole. This oxidation is advantageously carried out with an alkali hypochlorite or a copper salt. If the oxidation takes place with a copper salt then the result is the formation of the o-carboxy-o'-hydroxy copper complex of the dyestuff. If it is desired to produce the dyestuff free from copper, the copper can be removed in the conventional manner, for example by treatment with strong mineral acids such as hydrochloric acid or with agents providing S''-ions such as alkali sulfides or hydrosulfides.

The aminoazo dyestuffs of the last formula set forth above are themselves produced by coupling diazotized 4-nitro-4'-aminostilbene2:2'-disulfonic acid with 2-aminobenzene-1-carboxylic acid or by condensing 1 mol of 4:4'-dinitrostilbene-2:2'-disulfonic acid with 1 mol of 2:5-diaminobenzene-1-carboxylic acid, diazotizing the amine produced and coupling with a pyrazolone, thereupon reducing to the amino group the nitro group present in 4-position of the stilbene radical, diazotizing and finally coupling with an amine of the naphthalene series which couples in adjacent position to the amino group.

What has been stated with regard to the process of manufacture initially describes also applies mutatis mutandis in carrying out this modified process and the preparation of the starting materials required therefor.

The dyestuffs obtainable according to either of the methods of the present process, are new and correspond to the general formula

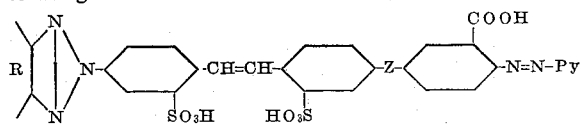

in which R indicates an aromatic radical which contains at the most two condensed rings and is condensed with the triazole ring at the positions indicated by the valence bonds, Z an azo or azoxy group and Py the radical of a 5-pyrazolone attached in 4-position to the azo group. Thus R may be a naphthalene radical free from further auxochromic groups. Py may be the radical of a 3-methyl-5-pyrazolone which is substituted in 1-position by an aromatic radical of the benzene series which is free from sulfonic acid groups, preferably a diphenyl radical.

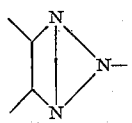

is the customary way of indicating the triazole radical. It is only intended to show that in this radical three nitrogen atoms are present together with two carbon atoms which are themselves attached together (in this case belonging to an aromatic 6-membered ring), it is not intended to express anything definite with regard to the nature of the bonds which connect the nitrogen atoms among themselves or to the carbon atoms.

The dyestuffs corresponding to the above formula are suitable for the dyeing of a wide variety of materials, for example animal fibers such as wool, silk and leather, but especially for the dyeing and printing of cellulosic materials such as cotton, linen, artificial silk and staple fiber from regenerated cellulose. The dyestuffs may be converted in substance, in the dyebath and on the fiber into complex metal compounds, for example copper, chromium, iron, nickel or cobalt compounds. The conversion into such complex metal compounds takes place by conventional methods in an acid, neutral or alkaline medium, with or without pressure and with or without additions such as salts of inorganic or organic acids, such as tartaric acid, or of acid-binding agents or agents promoting the complex formation, such as pyridine. The manufacture of the metal compounds, especially the copper compounds, in substance, is of especial value when the metal-containing dyestuffs possess a sufficient solubility (this is as a rule the case with dyestuffs containing four sulfonic acid groups). When the dyestuffs obtainable according to the present process contain only few solubilizing groups (for example only two or three sulfonic acid groups and the carboxyl group in o-position to the azo group) they can with advantage be treated on the fiber or partly on the fiber and partly in the dyebath, with agents providing metal according to conventional processes. With advantage, for example, the process of U. S. Patent No. 2,148,659 can be used, according to which, in the same bath, first dyeing is carried out and then the treatment with agents providing metal. As agents providing metal there are preferably applied in this case such as are stable towards alkaline solutions, such as complex copper tartrates.

In some cases especially valuable dyeings can be obtained by working by the process according to which the dyeings or printings produced with the metal-free dyestuffs, are after-treated with such aqueous solutions as contain the basic formaldehyde-condensation products of compounds which contain in the molecule at least once the atom grouping

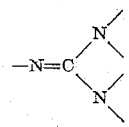

or, as for example in the case of cyanamide, are easily converted into such compounds, and water soluble, especially complex, copper compounds. Such processes are described for example in British Patent No. 619,969.

The following examples illustrate the invention, the parts being by weight unless otherwise stated and the percentages also being by weight and the relation between parts by weight and parts by volume being the same as that between the kilogram and the litre:

*Example 1*

63.2 parts of the compound of the formula

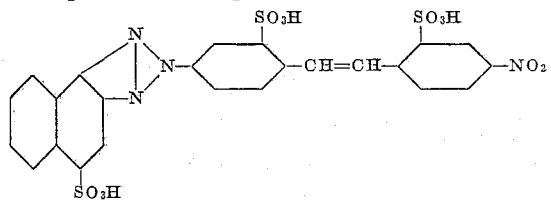

(obtainable by coupling diazolized 4-nitro-4'-amino-stilbene-2:2'-disulfonic acid with 1-aminonaphthalene-4-sulfonic acid and oxidizing the obtained azo dyestuff) in the form of the sodium salt, are dissolved in 500 parts of hot water. A hot solution of 18 parts of 2:5-diaminobenzene-1-carboxylic acid in 200 parts of water and 16 parts of sodium hydroxide solution of 30 per cent. strength is introduced and then 80 parts of sodium hydroxide solution of 30 per cent. strength further added and the whole boiled for 4 hours and the dyestuff precipitated with 80 parts of sodium chloride and, after cooling filtered off. It is washed on the filter with 10 per cent. sodium chloride solution. If desired this dyestuff can be purified by dissolving it in dilute sodium hydroxide solution, precipitating again by addition of sodium chloride and filtering. 41 parts of the sodium salt, thus obtained, of the monoazo dyestuff, are dissolved in 500 parts of hot water, treated with 3.5 parts of sodium nitrite in the form of a 20 per cent. solution and the whole poured out with good stirring into ice and 27.5 parts of 30 per cent. hydrochloric acid. Stirring is carried out for several hours with cooling followed by treatment with a solution of 9.1 parts of 1-phenyl-3-methyl-5-pyrazolone in 150 parts of water, 6.9 parts of 30 per cent. sodium hydroxide solution and 25 parts of sodium carbonate. When the coupling is complete the dyestuff is filtered off and dried; it forms a brown-red powder which dissolves in concentrated sulfuric acid with a violet and in water with an orange coloration. Cotton is dyed by the single- or two-bath after-coppering process, in outstandingly light-fast orange shades which also possess good fastness properties to wet processing.

A product which is very similar in its properties to the dyestuff described in the above paragraph, can also be obtained by coupling of the diazotized aminostilbene triazole of the formula

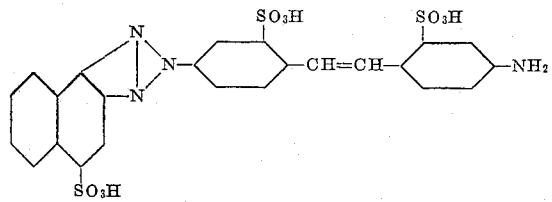

with the ω-methane sulfonic acid of the 2-amino-1-benzoic acid with subsequent hydrolysis.

A dyestuff which also has very similar properties to that described in the first paragraph of this example, can also be produced in the following manner:

4-nitro-4'-aminostilbene-2:2'-disulfonic acid is diazotized, coupled with the ω-methane sulfonic acid of 2-aminobenzene-1-carboxylic acid, thereupon the ω-methane sulfonic acid radical split off by acid or alkaline treatment and the monoazo dyestuff diazotized and coupled with the pyrazolone. The nitro group of the dyestuff is reduced to the amino group by heating with sodium sulfide and this group is then diazotized and the triazo dyestuff formed by coupling with 1-aminonaphthalene-4-sulfonic acid. The triazole compound is obtained by oxidation with a copper solution alkaline with ammonia. In order to obtain the dyestuff free from copper, it is demetallized according to one of the conventional methods, for example by heating with hydrochloric acid of about 4 per cent. strength.

Another possibility of arriving at the dyestuff of the preceding paragraph consists in that the intermediate product named in that paragraph

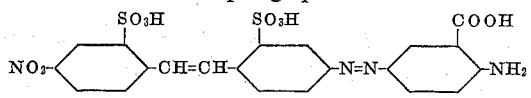

is acetylated on the amino group, thereupon the nitro group of the dyestuff reduced to the amino group and the latter diazotized and coupled with 1-aminonaphthalene-4-sulfonic acid. By oxidation with a copper solution there is obtained the triazole compound, the acylamino group of which is hydrolyzed and the amino group thus liberated thereupon diazotized. By coupling with the pyrazolone the same final dyestuff is obtained.

Dyestuffs with even better wet fastness properties are obtained when the 1-phenyl-3-methyl-5-pyrazolone is replaced by 1-[1:1''-diphenyl-(4')]-3-methyl-5-pyrazolone, 1-[4''-acetylamino-1':1''-diphenyl - (4')] - 3 - methyl-5-pyrazolone, 1-(4'-benzoylamino)-phenyl - 3 - methyl-5-pyrazolone or 1-naphthyl(2)-3-methyl-5-pyrazolone.

Example 2

80 parts of the trisodium salt of the dyestuff of the formula

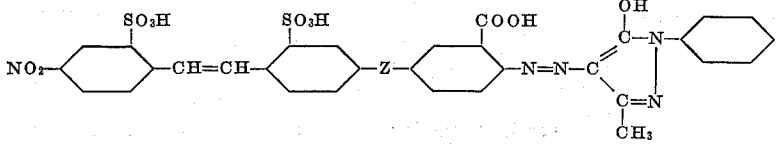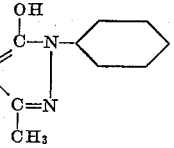

wherein Z represents an azo or azoxy group, obtainable by condensation of 4:4'-dinitrostilbene-2:2'-disulfonic acid with 2:5-diaminobenzene-1-carboxylic acid, diazotization of the condensation product obtained and coupling of the diazo compound with 1-phenyl-3-methyl-5-pyrazolone) are heated in 1500 parts of water to 65° C., treated with a solution of 41 parts of crystalline sodium sulfide in 200 parts of water and the whole stirred for 3 hours at 60–65° C. 250 parts of sodium chloride are introduced and, after cooling, the product is filtered and washed with sodium chloride solution of 10–15 per cent. strength. The aminodisazo dyestuff obtained is dissolved with heating in 1000 parts of water and after the addition of 7 parts of sodium nitrite in the form of a 20 per cent. solution, poured out with good stirring into ice and 55 parts of 30 per cent. hydrochloric acid. The whole is stirred for a few hours with cooling, any excess of nitrite destroyed with sulfamic acid, coupling is effected with a neutral solution of 32 parts of 1-aminonaphthalene-4:8-disulfonic acid and the mineral acid is neutralized with sodium acetate. When the coupling is complete the whole is rendered alkaline with sodium hydroxide solution and the dyestuff precipitated with 100 parts of sodium chloride. The trisazo-dyestuff obtained is dissolved with heating in 2000 parts of water and treated at 95° C. with an alkaline copper solution consisting of 100 parts of crystalline copper sulfate, 500 parts of water and 270 parts of a 24 per cent. ammonia solution. Stirring is carried on for several hours at about 95° C., followed by cooling, rendering slightly acid to Congo with hydrochloric acid and filtering off of the dyestuff. The latter, in the dry state, is a brown-red powder which dissolves in concentrated sulfuric acid with a violet, in dilute sodium carbonate solution with an orange-red coloration and which dyes cotton in orange shades which are extraordinarily fast to light.

A similar dyestuff which is likewise very fast to light, is obtained when the 1-aminonaphthalene-4:8-disulfonic acid is replaced by 2-aminonaphthalene-3:6-disulfonic acid.

Example 3

80 parts of the trisodium salt of the dyestuff of the formula set forth in Example 2 are reduced and diazotized according to the directions of Example 2. Any excess of nitrite is destroyed with sulfamic acid and the diazo compound is combined, in the presence of sodium acetate, with a suspension of 14.5 parts of 2-aminonaphthalene, the dyestuff being filtered off when the coupling is complete. This dyestuff is heated in 3000 parts of water to 95° C. with the addition of 20 parts of a 24 per cent. ammonia solution, treated with a solution of 100 parts of crystalline copper sulfate in 500 parts of water and 270 parts of a 24 per cent. ammonia solution and the whole stirred for several hours at about 95° C. After the mixture has been acidified with hydrochloric acid, the dyestuff is filtered off and, for removal of the copper, boiled for about 6 hours in 1000 parts of 4 per cent. hydrochloric acid. The filtered and dried dyestuff forms a brown-red powder which dissolves in concentrated sulfuric acid with a violet and in dilute sodium carbonate solution with a yellow-red coloration. By the single-or two-bath after-coppering process there are obtained on cotton orange colour shades of very good fastness to light and good wet fastness properties.

Instead of being carried out, as above described, with copper oxide-ammonia, the oxidation to the triazole can also be effected with sodium hypochlorite. For this purpose the trisazo dyestuff is brought into a finely dispersed form as follows: The dyestuff paste is stirred into 6000 parts of water, rendered weakly alkaline with sodium hydroxide solution, heated to 100° C. and cooled to about 35° C. by addition of ice. After the introduction of 10 parts of sodium chloride for each 100 parts by volume of the reaction mixture, cooling to 25° C. is carried out and at this temperature 225 parts of sodium hypochlorite solution containing 13–14 per cent. of active chlorine then introduced. After a short time the brown colour of the suspension has changed to orange and the dyestuff now dissolves is concentrated sulfuric acid with a violet coloration (previously the coloration was blue). As soon as no further change takes place, any excess of oxidizing agent is destroyed, for example with sodium thiosulfate, and the dyestuff is filtered off. It is practically identical with that described above.

Dyestuffs which when dyed according to the single- or two-bath after-coppering process, give dyeings of still better fastness to washing, are obtained when instead of the starting dyestuff obtainable from 1-phenyl-3-methyl-5-pyrazolone, the corresponding dyestuffs are used produced from 1-[4''-acetylamino-1':1''-diphenyl-(4')]-3-methyl-5-pyrazolone or 1-(3'- or 4'-benzoylamino)-phenyl-3-methyl-5-pyrazolone.

Example 4

100 parts of cotton are entered at 50° C. into a dyebath which contains, in 4000 parts of water, 1 part of the dyestuff obtainable according to the first paragraph of Example 1 and 2 parts of anhydrous sodium carbonate, the temperature is raised in the course of 20 minutes to 90–95° C., 40 parts of crystalline sodium sulfate are added and dyeing is carried on for 30 minutes at 90–100° C. Thereupon the whole is allowed to cool to about 70° C., 1 part of complex sodium copper tartrate of approximately neutral reaction is added, coppering follows for ½ hour at about 80° C. and the dyeing is then rinsed with cold water. If desired the dyeing can be soaped by after-treatment with a solution containing 5 parts of soap and 2 parts of anhydrous sodium carbonate in 1000 parts by volume of water. An orange dyeing is obtained of good fastness to light and washing.

What is claimed is:
1. An azo dyestuff of the formula

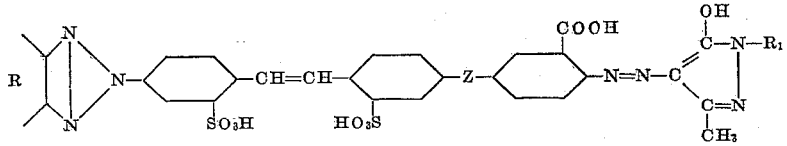

in which R represents a naphthalene radical which is condensed with the triazole ring at the positions indicated by the valence bonds and contains as the only substituent at least one and at the most two sulfonic acid groups, Z represents a member selected from the group consisting of an azo and an azoxy group, and $R_1$ represents an aromatic radical containing at the most two six-membered rings, $R_1$ being free from sulfonic acid groups.

3. An azo dyestuff of the formula

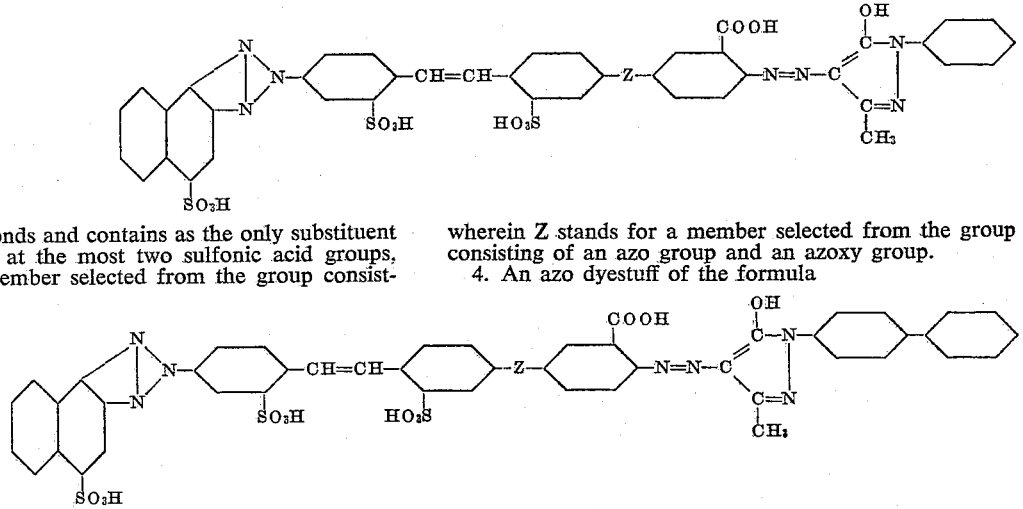

wherein Z stands for a member selected from the group consisting of an azo group and an azoxy group.

4. An azo dyestuff of the formula

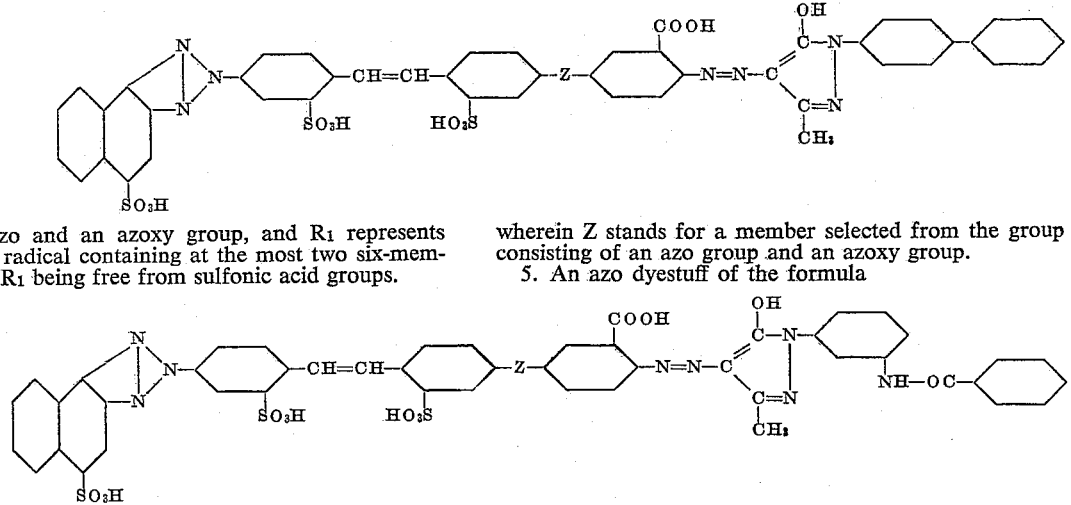

wherein Z stands for a member selected from the group consisting of an azo group and an azoxy group.

5. An azo dyestuff of the formula

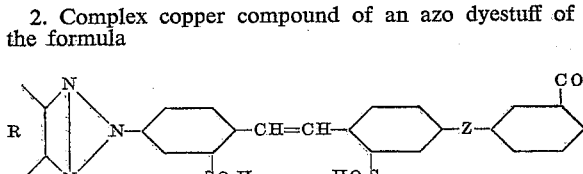

wherein Z stands for a member selected from the group consisting of an azo group and an azoxy group.

2. Complex copper compound of an azo dyestuff of the formula

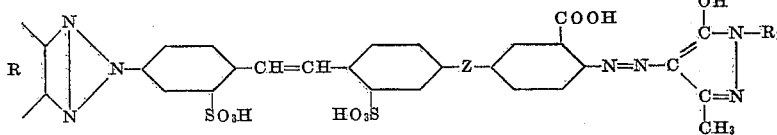

in which R represents a naphthalene radical which is condensed with the triazole ring at the positions indicated by the valence bonds and contains as the only substituents two sulfonic acid groups, Z represents a member selected from the group consisting of an azo and an 6. An azo dyestuff of the formula

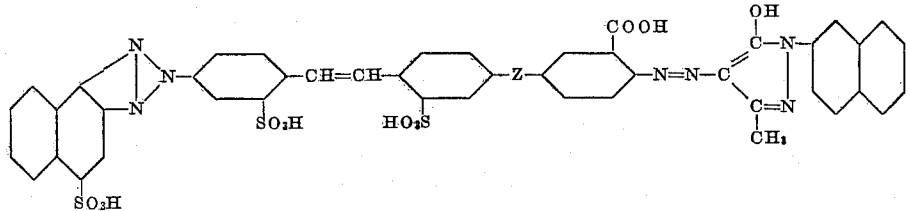

wherein Z stands for a member selected from the group consisting of an azo group and an azoxy group.

7. Complex copper compound of an azo dyestuff of the formula

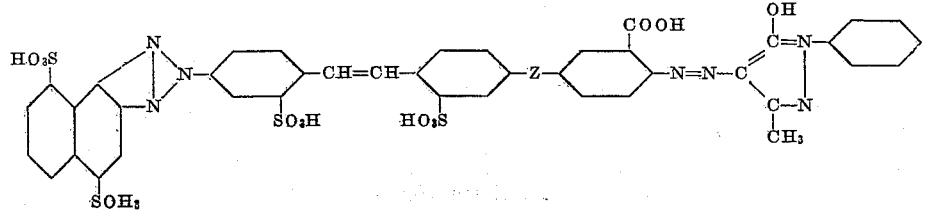

wherein Z stands for a member selected from the group consisting of an azo group and an azoxy group.

8. A dyestuff selected from the group consisting of a dyestuff of the formula

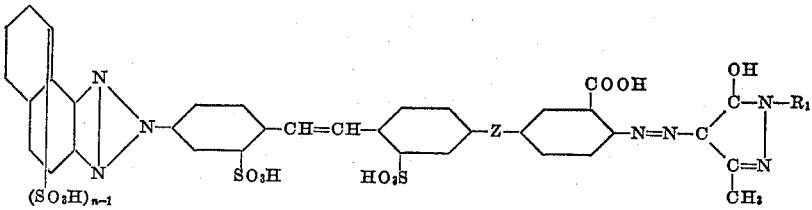

and a complex copper compound of an azo dyestuff of this formula, in which $n$ represents a whole number of at the most 3, Z represents a member selected from the group consisting of an azo group and an azoxy group, and $R_1$ represents an aromatic radical containing at the most two six-membered rings, $R_1$ being free from sulfonic acid groups.

References Cited in the file of this patent

UNITED STATES PATENTS

| Number | Name | Date |
|---|---|---|
| 2,314,023 | Straub et al. | Mar. 16, 1943 |
| 2,394,998 | Keller | Feb. 19, 1946 |
| 2,405,353 | Hanhart | Aug. 6, 1946 |
| 2,467,262 | Knight | Apr. 12, 1949 |